3,583,881
MINERAL-COATED PAPER AND METHOD OF
PRODUCING IT
Al Kennedy, Warrington, Pa., assignor to Rohm and
Haas Company, Philadelphia, Pa.
No Drawing. Filed Apr. 25, 1968, Ser. No. 724,292
Int. Cl. B44d 1/44; D21k 1/28
U.S. Cl. 117—65.2                                    9 Claims

ABSTRACT OF THE DISCLOSURE

In accordance with the present invention a glossy mineral-coated paper is obtained by applying a prime coat having an adhesive binder, subsequently applying a topcoat containing a synthetic addition polymer having an apparent second order transition temperature ($T_i$) of at least 43° C., and subsequently gloss calendering the coated paper. The $T_i$ value referred to is the transition temperature or inflection temperature which is found by plotting the modulus of rigidity against temperature. A convenient method for determining modulus of rigidity and transition temperature is described by I. Williamson, British Plastics, 23, 87 to 90, 102 (September 1950). The $T_i$ value here used is that determined at 300 kg./cm.$^2$.

U.S. Pats. 3,028,258 and 3,132,042 disclose the production of high gloss mineral-coated papers by the application of one or more coats of a mineral-binder-containing composition and subsequently developing gloss in the coated paper by a calendering and brushing action such as on a supercalender. In 3,132,042 specifically the mineral-coated paper is obtained by first applying an adhesive prime coat and then applying a topcoat containing a mixture of addition polymers which mixture contains a soft polymer and a hard homopolymer such that the mixture has a $T_i$ (apparent second order transition temperature) of not over 40° C. As pointed out in column 8, lines 27–28 of this patent "the hard polymer would itself be quite ineffective as the sole binder material" in the topcoat.

The use of a supercalender involves high pressures and, hence, it is not adapted to the production of high gloss mineral-coated paperboards of low density. The high pressure causes serious compaction and increase in the density of the coated paperboard during the supercalendering operation.

In accordance with the present invention, it has been found that high gloss mineral-coated paper products having a wide variety of densities can be obtained by a two-coat process and the use of an ordinary gloss calender which involves considerably less pressure than the supercalender. The first or prime coat that is applied in accordance with the present invention serves as an adhesive layer adapted to adhere well to the paper fiber substrate as well as to the components of the topcoating layer subsequently applied. The prime coating composition is of a soft character and the binder thereof may be composed of a wide variety of known substances or mixtures thereof. For example, the binder in the prime coating may be a protein such as casein, gelatin, or soyabean protein; it may be of carbohydrate type such as starch, ethylene oxide derivatives of starch containing from 1 to 3 oxyethylene units per glucose unit of the starch, gum arabic, pectins, plant gums, agar-agar; cellulose derivatives such as carboxymethyl cellulose, methyl cellulose, hydroxyethyl cellulose and others of water-soluble character; and polyvinyl alcohol.

As the soft binder, there may also be used latices of synthetic rubbers of soft character such as copolymers of butadiene and styrene, copolymers of acrylonitrile and styrene and copolymers of acrylonitrile, butadiene and styrene; also analogous polymers of isoprene, chlorobutadiene or other diene; also polyisobutylene.

There may also be used addition emulsion polymers of various ethylenically unsaturated monomers such as polymers of acrylic acid esters or methacrylic acid esters having combined in the polymer from about 1 to 10% of an acid such as acrylic acid, methacrylic acid or itaconic acid or of an amide such as of acrylamide or methacrylamide. Any acrylic acid ester with an alcohol having from 1 to 8 or more carbon atoms such as methyl acrylate, ethyl acrylate, butyl acrylate, 2-ethylhexyl acrylate, lauryl acrylate or octadecyl acrylate or a mixture of such esters may be copolymerized with the acid. Similarly, the acid may be copolymerized with methacrylic acid esters of an alcohol having from 4 to 8 or more carbon atoms such as butyl methacrylate, hexyl methacrylate, 2-ethylhexyl methacrylate and so on. Such copolymers having the appropriate amount of acid mentioned hereinabove having $T_i$ values of 20° C. or less such as down to —40° C. and consequently they are quite soft and because of the content of acid or amide, they have an adhesive effect for bonding the paper substrate to the topcoating layer that is subsequently applied. The copolymers of the acid or amide with the "soft" esters just mentioned may also contain copolymerized therein appreciable amounts of a hardening monomer such as of methyl methacrylate, ethyl methacrylate, acrylonitrile, styrene, vinyl toluene or a mixture thereof provided the $T_i$ value does not exceed 20° C. Copolymers having higher $T_i$ values up to 35° C. may be used as the prime coat when the copolymers contain a substantial amount of vinyl acetate therein. The various soft addition polymers that may be used as the binder of the topcoat include those of U.S. Pats. 2,790,735, 2,790,736, 2,874,066 and 3,152,922. Mixtures of these soft polymers may be employed or one or more of the soft polymers may be used in conjunction with one or more of the other binder materials such as a protein, a carbohydrate or a water-soluble cellulose derivative.

When the polymer contains acid groups, the aqueous dispersion thereof is preferably on the alkaline pH side and the copolymer is in the form of its salt of an alkali-metal or ammonium hydroxide or of an amine. The ammonium salts are preferred because of the volatility of ammonia during drying.

The prime coat should contain a mineral component which is preferably predominantly clay but may also include titanium dioxide, zinc sulfide, calcium carbonate or the like. Mixtures of clay and one of the other minerals mentioned may be employed. The clays and the other minerals should be of small size and preferably of pigment grade; more specifically at least 85% of the particles of the respective mineral substances should be less than 2 microns in size. Preferably all of the particles are less than 2 microns in size.

The amount of binder that is used is generally from about 8 parts to 24 parts by weight per hundred parts by weight of the mineral component. The solids content of the prime coating composition may range from about 40 to 65% by weight. It is applied to provide a deposit of about 1 to 10 pounds dry weight per 3,000 square feet of paper or paperboard, the particular amount being dependent upon the thickness of the paper sheet and the overall properties generally desired. If the paper has a basis weight of 25 pounds or less per ream of 2-ft. x 3-ft. sheets, then the prime coat is preferably applied in the range of 2 to 4 pounds dry weight per 3,000 square feet of paper surface. On the other hand with higher basis weight papers and paperboards the deposit may range from 5 to 10 or more pounds per 3,000 square feet.

The prime coat may be applied by any suitable system, such as a trailing-blade coater, an air-knife coater or other conventional coating systems which are equipped with proper devices to control the thickness of the coating. The coating is generally applied at room temperature but the actual ambient temperature in the paper plant may be somewhat higher than normal room temperature such as up to 60° C. and application at this elevated temperature is entirely satisfactory and practical.

The binder that is essential in the topcoating compositions is an addition copolymer of monoethylenically unsaturated monomers containing from about 1 to 10% of an acid or of an amide. Examples of the amide include acrylamide and methacrylamide and examples of the acid include acrylic acid, methacrylic acid, itaconic acid, maleic acid, fumaric acid, aconitic acid, citraconic acid, acryloxyacetic acid, methacryloxypropionic acid and so on. It has been found that the copolymer in the topcoating compositions must have a $T_i$ value of at least 41° C. up to about 105° C. or higher. One or more of these hard copolymers (that is those having a $T_i$ value of at least 41° C.) may be used with one or more of a softer polymer having a $T_i$ of 41° C. as mentioned hereinbefore provided the amount of the soft binder employed does not lower the $T_i$ value of the mixture of binders including all the hard and the soft components to a $T_i$ value below 43° C. Generally, it is preferred that the entire binder component of the topcoating composition consist of one or more of the addition polymers hereinabove described having a $T_i$ of at least 43° C.

As in the prime coating, the topcoating also contains mineral substances which may be the same as those mentioned hereinbefore and the mineral content of the composition predominantly or entirely clay. The proportion of binder to mineral substances in the topcoating layer falls in the same range as given for the prime coat. Similarly, the solids content of the coating composition may be in the range specified in respect to the prime coat.

It has been found that the $T_i$ of all polymer components of the binder in the topcoat must be at least 43° C. and preferably each of the polymer components of the binder has a $T_i$ of at least 41° C. in order to prevent sticking of the coating to the hot steel roll used in the gloss calender. Hence a topcoating composition containing a mixture of polymers of which 35 to 50% by weight is constituted of a soft polymer having a $T_i$ of 10° C. or lower would not be satisfactory for the present process using a gloss calender. Apparently because of the relatively higher temperature of the steel roll in a gloss calender, as compared to that used in a supercalender, such a mixture of polymers raises difficulties, such as sticking, in a gloss calender. However, in a supercalender operating at lower temperature and involving a brushing action, the low $T_i$ polymer is apparently necessary to prevent partial or complete removal of the coating by the friction exerted by the brushing action.

It is theorized that the success of the present invention results from the cooperative action of several factors peculiar to the invention. Thus, the application of the hot steel roll at a temperature of 300° F. and up to the exposed surface of the topcoating softens the binder of the prime coat and thereby enhances the adhesion thereof to the hard polymer particles. At the same time, the hot roll presses the hard particles partially into the soft prime coat so that all irregularities in the top surface are smoothed out by compensatory embedment of the hard particles, the depth of penetration into the prime coat at any point being proportioned to the extent to which the hard particle or particles in the topcoat adjacent that point protrude from the exposed surface. While this action may account partly or completely for the excellent smoothness and gloss obtained by the present invention without the requirement for brushing and also for the avoidance of sticking to the roll and the development of good resistance to pick, nevertheless, it is not intended that the invention be limited by this theory of operation.

Before the topcoating is applied, the prime coat should be dried to a moisture content which does not exceed about 10% by weight of the coating layer and preferably is not over 5% by weight thereof. Drying of the first coat may be effected at room temperature, but on the paper machine is preferably carried out on drying rolls at elevated temperatures in the range of 100–150° F. After the prime coated paper has been dried to the extent specified, the topcoating composition may be applied by any suitable mechanism such as those mentioned hereinbefore for the application of the prime coating composition. After the application of the topcoating, the coated paper thereby obtained is dried to 5% moisture content or less and thereafter the coated paper is passed to the conventional gloss calender operating in the range of about 200 to 600 pounds per lineal inch and 325 to 400° F. at a speed in the range of 400 to 600 feet per minute. The drying of the topcoating is effected at an elevated temperature to assure fusion of the polymer therein, the temperature being about 20° C. to 60° C. higher than the $T_i$ of the polymer applied in the topcoating. In the gloss calender the sheet passes through the nip beween the steel and rubber-covered rolls at essentially the same speed as the peripheral speed of the rolls so that there is no frictional rubbing or brushing effect on the coating. However, the gloss obtained as a result of passage through the conventional gloss calender is quite high even without any brushing action as is done with the conventional supercalender.

While the description herein mentions the coating of one surface of the paper, both faces may be so coated if desired.

To assist those skilled in the art to practice the present invention, the following modes of operation are suggested by way of illustration, parts and percentages being by weight and the temperature in ° C. unless otherwise specifically noted.

(1)(a) 100 parts of fine coating clay (kaolin) and 0.2 part of sodium hexametaphosphate are mixed in 48 parts of water, and 0.2% (on the weight of clay) of 28% ammonium hydroxide is added to adjust the pH to 9. The mixture thus obtained is added to 36 parts of an aqueous dispersion containing about 50% of a copolymer having a $T_i$ of about 20° C. obtained by the emulsion copolymerization of a mixture of 64 parts of ethyl acrylate, 31 parts of methyl methacrylate, and 5 parts of methacrylic acid in about 100 parts of water in the presence of 6 parts of a t-octylphenoxypolyethoxyethanol containing about thirty oxyethylene units and a catalyst such as small amounts of ammonium persulfate and sodium hydrosulfite. After polymerization, ammonium hydroxide is added to adjust the composition to a pH of 9.

(b) A paperboard (0.017 inch thick) after formation and drying on the paper machine is passed through a trailing-blade coater in which there is applied the composition of part (a), the blade being set to deposit 6 lbs. dry weight from this composition per 3,000 square feet. After drying to a moisture content of about 5%, the paper is topcoated by passage through another trailing-blade coater on the machine with a coating composition having a pH of 9.0 and 61% solids content and containing clay and, for each 100 parts of clay, 0.1 part of sodium hexametaphosphate, 0.1 part of ammonia (28%) and 16 parts of an emulsion copolymer of about 43% ethyl acrylate, about 49% styrene, and about 7% methacrylic acid having a $T_i$ of about 43° C. The coated sheet proceeds through a drying section of the machine and after attaining a moisture content of 10% or less, it passes through a conventional gloss calender in which the pressure between the steel and rubber-covered rolls is 400 p.l.i. (pounds per lineal inch) and the temperature of the steel roll against the surface of which the coated face of the paper is pressed is 325° C.

The coated paper has a gloss of 81 when measured on the 75° Gardner glass meter. It is quite smooth on the coated face and shows excellent pick resistance.

(2) The procedure of (1) is repeated except that the polymer used in part (a) thereof is replaced by an emulsion copolymer of 87% ethyl acrylate, 10.5% methyl methacrylate, and 2.5% of itaconic acid having a $T_i$ of about −3° C. The coated paper obtained has good gloss and smoothness and excellent pick resistance.

(3) Similar results are obtained when procedure (1) is repeated except that in part (a) thereof the polymer is replaced by an emulsion copolymer of 87% butyl acrylate, 8% of acrylonitrile, and 5% of methacrylamide having a $T_i$ of about 5° C.

(4) Similar results are obtained when Procedure (1) is repeated except that in part (a) thereof the polymer is replaced by an emulsion copolymer of 40% ethyl acrylate, 20% 2-ethylhexyl acrylate, 33% styrene, and 7% acryloxyacetic acid.

(5) Procedure (2) is repeated except that in part (b) thereof the polymer is replaced by an emulsion copolymer of 46% ethyl acrylate, 46% styrene, and 8% methacrylic acid having a $T_i$ of about 64° C. The resulting coated paper had excellent gloss and smoothness and good pick resistance.

(6) Procedure (2) is repeated except that in part (b) thereof the polymer is replaced by an emulsion copolymer of 40% ethyl acrylate, 40% styrene, 10% methyl methacrylate and 10% methacrylic acid having a $T_i$ of 75° C. The coated paper obtained has good gloss (about 83 on the 75° Gardner gloss meter). It is quite smooth and shows excellent pick resistance.

(7) Procedure (2) is repeated except that in part (b) thereof the polymer is replaced by an emulsion copolymer of 27% butyl acrylate, 70% styrene and 3% methacrylic acid having a $T_i$ of about 65° C. Results comparable to those of procedure (6) are obtained.

(8) Procedure (1) is repated except that in part (a) thereof the polymer is replaced by an emulsion copolymer of 40% butadiene, 59% styrene and 1% of acrylic acid having a $T_i$ of 6° C. Results similar to those of Procedure (1) are obtained.

(9) Procedure (1) is repeated except that in part (a) thereof the polymer is replaced by an emulsion copolymer of 55% butyl acrylate, 42% styrene and 3% methacrylic acid having a $T_i$ of 10° C.

(10) Procedure (2) is repeated except that in part (a) of (1) the amount of aqueous dispersion of copolymer was reduced to 32 parts (instead of 36 parts) and 2 parts by weight of starch is added to the prime coating composition. The results obtained are similar to those of procedure (1).

(11) Procedure (2) is repeated except that in part (a) of (1) the amount of aqueous dispersion of copolymer was reduced to 18 parts and 9 parts by weight of α-protein are added to the prime coating composition.

I claim:

1. In a method of producing glossy mineral-coated paper which comprises applying to at least one surface of the paper an aqueous dispersion of a soft adhesive coating composition containing a finely-divided mineral substance predominantly of clay and a binder therefor, drying the coated paper, then applying an aqueous dispersion of a second coating composition containing a finely-divided mineral substance and a binder therefor thereafter drying the coated paper at a temperature at least 20° C. to 60° C. above the apparent second order transition temperature of the vinyl addition polymer or of the mixture of polymers in the second coating composition and subsequently passing the dried paper through an ordinary gloss calender operating at a pressure in the range of about 200 to 600 pounds per lineal inch, a temperature of at least 300° F. up to 400° F. and a speed of 400 to 600 feet per minute that is essentially the same speed as the peripheral speed of the calender rolls, the improvement wherein the binder in the second coating composition comprises at least one vinyl addition copolymer of monoethylenically unsaturated monomers containing from about 1 to 10% of an acid or of an amide having an apparent second order transition temperature of at least 41° C., each of the addition polymers in this binder having an apparent second order transition temperature of at least 41° C. when the binder contains a plurality of such polymers.

2. A method according to claim 1 in which the adhesive coating has a binder formed of a salt of vinyl addition polymer containing 1 to 10% of acid-containing units and having an apparent second order transition temperature of up to 35° C.

3. A method according to claim 1 in which the adhesive coating has a binder formed of a salt of vinyl addition polymer containing 1 to 10% of acid-containing units and having an apparent second order transition temperature of up to 20° C.

4. A method according to claim 1 in which the vinyl addition polymer of the binder of the subsequently applied coating composition contains 1 to 10% by weight of acid-containing units in salt form and has an apparent second order transition temperature in the range of 43° to 105° C.

5. A method according to claim 1 in which binder of the second coating composition consists essentially of a copolymer of monoethylenically unsaturated monomers containing from about 1 to 10% of an acid or of an amide, having an apparent second order transition temperature in the range of 43° C. to 105° C.

6. A method according to claim 5 in which the copolymer in the second coating composition is a copolymer containing units of styrene and of ethyl acrylate or butyl acrylate.

7. A method according to claim 6 in which the copolymer in the second coating composition also contains units of methyl methacrylate.

8. A method according to claim 1 in which the adhesive coating has a binder formed of a salt of vinyl addition polymer containing 1 to 10% of acid-containing units and having an apparent second order transition temperature of up to 35° C. and the copolymer of the second coating composition contains 1 to 10% by weight of acid-containing units in salt form and has an apparent second order transition temperature in the range of 43° C. to 105° C.

9. A method according to claim 1 in which the binder of the adhesive coating contains a copolymer of (1) an ester of acrylic acid with an alcohol having 1 to 8 carbon atoms or of methacrylic acid with an alcohol having 4 to 8 carbon atoms and (2) about 1 to 10% by weight of a monoethylenically unsaturated acid or amide, and (3) optionally methyl methacrylate, ethyl methacrylate, acrylonitrile, styrene, vinyltoluene or a mixture thereof and the binder of the second coating composition consists essentially of a copolymer of monoethylenically unsaturated monomers containing from about 1 to 10% of an acid or of an amide having an apparent second order transition temperature int he range of 43° to 105° C.

References Cited

UNITED STATES PATENTS

| | | | |
|---|---|---|---|
| 3,288,632 | 11/1966 | Rush | 117—76 |
| 3,132,042 | 5/1964 | Weber | 117—83 |
| 2,554,662 | 5/1961 | Cowgill | 117—155 |
| 2,554,663 | 5/1961 | Cowgill | 117—155 |
| 3,413,139 | 11/1968 | Rasmussen et al. | 117—65.2 |
| 3,281,267 | 10/1966 | Rice | 117—155 |
| 3,152,922 | 10/1964 | McLaughlin et al. | 117—155 |
| 3,044,896 | 7/1962 | Warner | 117—83 |
| 3,028,258 | 4/1962 | Rice | 117—156 |
| 2,790,735 | 4/1957 | McLaughlin et al. | 117—155 |

WILLIAM D. MARTIN, Primary Examiner

M. SOFOCLEOUS, Assistant Examiner

U.S. Cl. X.R.

117—76, 155